United States Patent
Wong

(10) Patent No.: US 8,208,025 B1
(45) Date of Patent: Jun. 26, 2012

(54) EFFICIENT REDUNDANT VIDEO MONITORING SYSTEM

(76) Inventor: Thomas K. Wong, San Francisco, CA (US)

( * ) Notice: Subject to any disclaimer, the term of this patent is extended or adjusted under 35 U.S.C. 154(b) by 434 days.

(21) Appl. No.: 12/459,529

(22) Filed: Jul. 1, 2009

(51) Int. Cl.
*H04N 7/00* (2011.01)
(52) U.S. Cl. ........................................ 348/159; 348/143
(58) Field of Classification Search ........................ None
See application file for complete search history.

(56) References Cited

U.S. PATENT DOCUMENTS

2005/0190263 A1* 9/2005 Monroe et al. ................ 348/159

* cited by examiner

*Primary Examiner* — Mehrdad Dastouri
*Assistant Examiner* — James Anderson, II
(74) *Attorney, Agent, or Firm* — Thomas R. Lampe

(57) ABSTRACT

A video monitoring system including two monitoring stations, each station having a plurality of monitoring screens, the same surveillance video images appearing on monitoring screens of both of said stations but the relative positioning of said surveillance video images differing at said stations.

7 Claims, 2 Drawing Sheets

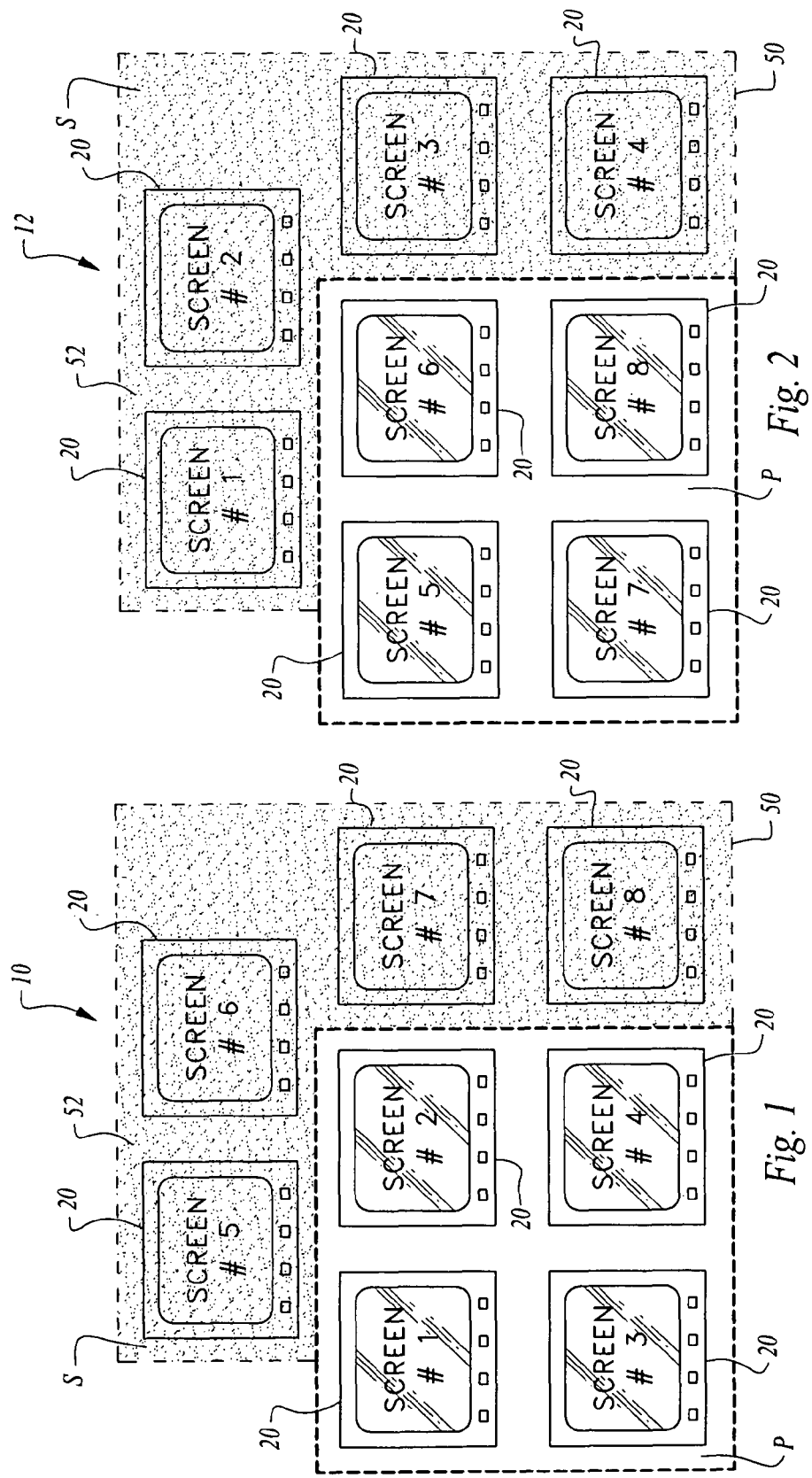

EFFICIENT REDUNDANT VIDEO MONITORING SYSTEM

TECHNICAL FIELD

This invention relates to a video monitoring system, and more particularly to a method and apparatus employed to monitor a plurality of surveillance video images.

BACKGROUND OF THE INVENTION

In the video surveillance industry much focus has been on cameras, detection hardware, video transmission, and video analytics software. Other than the development of very expensive video analytics software, little attention has been given to improving the fundamentals of video monitoring. One of the biggest challenges for effective monitoring rests with fatigue of the person or persons monitoring the video images, resulting in loss of comprehension of the images being watched. The industry's current approaches to this problem include frequent rest breaks, rotation of monitoring personnel when adequate resources are available, and adding alarms or analytics software to alert the monitoring agent or agents of special events.

The performance of current analytics software is far from ideal. These computer software products are supposed to have some level of "intelligence" to identify threats from the video images and alert the monitoring individual or individuals when those threats arise, but they often fall short, giving excessive amount of false alarms. Perhaps the biggest draw back is its expense, which can be as high as $10,000 per camera, when all costs are taken into consideration.

Adding sensors such as motion detectors to alert the monitoring agent is helpful, but there are many situations where adding such sensors are not possible or cost effective. Further, sensors such as those for outdoor motion detection are notorious for giving false alarms.

For the vast majority of surveillance monitoring situations, the burden of effective monitoring still rests squarely on the people serving as monitoring agents. Moreover, except for extra high security applications such as those for the military, there are insufficient personnel available to frequently rotate the monitoring agents.

The most practical prior art approach is to allow the monitoring individuals to take frequent breaks. However, this approach creates its own set of problems. When a monitoring agent is on break, the screens are either not being watched, creating vulnerability, or a new monitoring agent must be available. Having extra personnel to cover breaks adds cost and creates staff scheduling problems. In addition, it takes the new agent time to become familiar with the scenes being watched, which may reduce his or her effectiveness.

DISCLOSURE OF INVENTION

The subject invention effectively addresses the monitoring fatigue issues without the shortcomings listed above. Moreover, the video monitoring system disclosed and claimed herein provides critical redundancy without sacrificing efficiency. Since humans are not perfect, having a layer of redundancy can improve monitoring reliability substantially. Providing such redundancy with very little added cost makes this invention highly valuable to the video surveillance industry. This invention is most suitable when the monitoring load requires the capacity of a pair of monitoring agents. For lighter workload situations, the invention is still effective, but the efficiency will be reduced.

The invention includes a video monitoring method including the step of providing a first monitoring station having a plurality of monitoring screens and the step of providing a second monitoring station having a plurality of monitoring screens.

A plurality of surveillance video images are displayed on the monitoring screens of the first and second monitoring stations. Surveillance video images on monitoring screens of the first monitoring station are the same as surveillance video images on the monitoring screens of the second monitoring station, but the relative positioning on the video images displayed on the monitoring screens of the first monitoring station differ from the relative positioning of the video images displayed on the monitoring screens of the second monitoring station.

In a preferred embodiment, the first and second monitoring stations are disposed side by side and the monitoring screens of the first and second monitoring stations are positioned for observation by two individuals from locations in front of the first and second monitoring stations.

The invention also includes video monitoring apparatus including a first monitoring station having a plurality of monitoring screens and a second monitoring station having a plurality of monitoring screens.

Video signal receiving hardware is provided for distribution of video signals to the monitoring screens of the first and second monitoring stations to produce a plurality of surveillance video images on the monitoring screens of the first and second monitoring stations. The surveillance video images on monitoring screens of the first monitoring station are the same as the surveillance video images on the monitoring screens of the second monitoring station, but the relative positioning of the video images displayed on the monitoring screens of the first monitoring station differ from the relative positioning of the video images displayed on the monitoring screens of the second monitoring station.

Other features, advantages and objects of the present invention will become apparent with reference to the following description and accompanying drawings.

BRIEF DESCRIPTION OF DRAWINGS

FIG. 1 is a front view of a first monitoring station illustrating positioning of eight monitoring screens at the first monitoring station;

FIG. 2 is a front view of a second monitoring station illustrating positioning of eight monitoring screens at the second monitoring station;

BEST MODE FOR CARRYING OUT THE INVENTION

Figure 3:
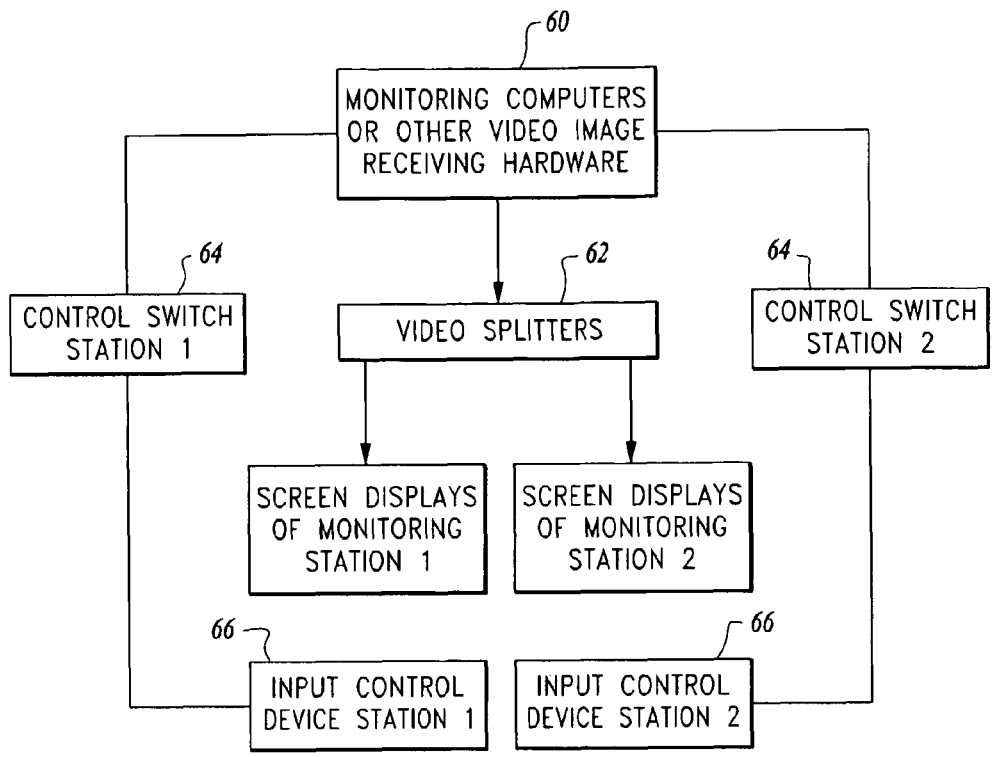
FIG. 3 is a schematic diagram illustrating components of apparatus constructed in accordance with the teachings of the present invention.

Referring now to the drawings, apparatus constructed in accordance with the teachings of the present invention consists of two monitoring stations 10 and 12. Both stations have the same number of monitoring screens 20. Each screen 20 may display images from one or multiple video channels. The monitoring screens display the same video images at both stations, but the order of viewed screen placement at the stations is different. That is, the relative positioning of the video images displayed on the monitoring screens 20 of the first monitoring station 10 differs from the relative positioning of the video images displayed on the monitoring screens of the second monitoring station 12. These images come from a plurality of video surveillance cameras (not shown).

The total number of screens at each station should not exceed what one monitoring individual can handle for a short duration with full concentration. The total number of screens for a given application may vary significantly depending on the size of each screen, the complexity of the video images, and the required degree of reliability. As an example for illustration purposes, each of the two monitoring stations has eight screens, assuming that the comfortable long duration monitoring workload for this particular application is four screens per agent and one agent can monitor all eight screens adequately for a short duration.

Each of the monitoring stations has a primary vision area P and a secondary vision area S. In FIGS. 1 and 2, the primary vision area is the space or area encompassing the screens where an individual has primary monitoring responsibility. The secondary vision area encompasses individual screens where an agent has secondary monitoring responsibility. According to the teachings of this invention, screens #1 to #4 are placed in the primary vision area P of station 10. The remainder of the screens (#5 to #8) are placed in the secondary vision area S of station 10. At station 12, the screens corresponding to those in the secondary vision area S of station 10 are placed in the primary vision area P of station 12. The screens in the primary vision area of station 10 are placed in the secondary vision area S of station 12. In short, every one of the screens is included in a primary vision area of either station 10 or 12, and appears again in the secondary vision area of the other station. In FIGS. 1 and 2 the secondary vision areas S of the monitoring stations are darkened to more clearly distinguish the positions of the primary and secondary vision areas.

Humans have central vision and peripheral vision. Central vision is the straight-ahead vision, which is used for tasks such as driving and reading, while peripheral vision provides the ability to see objects and movement outside of the direct line of vision. Peripheral vision can be practiced to improve performance; a successful juggler develops good peripheral vision to see and catch objects. The effective central vision area of a monitoring agent is a function of the video image sizes and the distance between the agent's eyes and the screens. Movement of an agent's head and/or chair rotation will change the size and location of the central vision area. When practicing this invention, the primary vision area of each monitoring station is to be kept within the range of an agent's central vision. The secondary vision area will be watched mainly by the peripheral vision of an agent, and is to be kept within range of an agent's peripheral vision.

Figure 4:
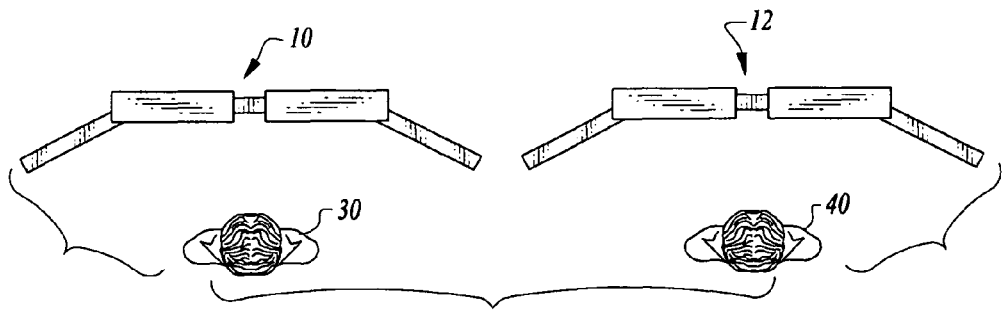
FIG. 4 is a diagrammatic plan view illustrating the first and second monitoring station and two individuals monitoring video images on the monitoring screens thereof.

FIG. 4 is a plan view showing the monitoring stations 10, 12 disposed adjacent to one another and side by side. Together, FIGS. 1 and 2 also show the side by side relationship of stations 10, 12. An individual (agent) is positioned at a location spaced from and in front of each station. FIG. 4 is not necessarily to scale. FIG. 4 also indicates that the topmost and end-most screens at the station are tilted relative to the other screens in the direction of the responsible agent. The screens of a station may instead be co-planar or oriented in some other placement.

In operation, agent 30 takes primary responsibility to monitor the screens within his or her primary vision area, in this example, screens 1 to 4. He or she also has secondary responsibility for glancing at the screens in his or her secondary vision area from time to time, that is screens #5 to #8. Similarly, agent 40 takes primary responsibility for screens #5 to #8, and secondary responsibility for screens #1 to #4, thereby creating a redundant monitoring system for each screen. If the agent misses certain activities in his or her assigned primary vision area for whatever reason, there is a second chance that the other agent can observe the missed activities.

The benefits of this system are numerous.

1. With this system, the ability of using peripheral vision is not wasted. It is now applied to create valuable redundancy, without additional monitoring personnel.

2. Moving the eyes to look at the secondary vision area from time to time is highly beneficial and can reduce fatigue. This is similar to driving on a straight highway; a driver can stay alert and less likely to lose comprehension of the scenes by glancing at the sides of the road from time to time.

3. Since each agent is already familiar with the context of all the screens, when the partner agent is on break, there is no loss of continuity, and no monitoring performance degradation. Although the remaining agent temporarily has a much heavier workload, it is only for a short duration. Tests have shown that as long as the heavy workload is not excessive, and the duration remains short, such as for 10 minutes (enough to give the partner agent a break), there is no loss of monitoring effectiveness. The system offers a smooth monitoring operation even when frequent breaks are taken.

4. The system also allows for very effective backup and teamwork when both agents are on duty. For example, when one agent is distracted while handling an incident such as talking to the police, the partner agent can immediately provide backup by watching all screens, thus maintaining a consistent high level of monitoring reliability.

The size and shape of the primary and secondary vision areas of each monitoring station need not be the same. For example, in a nine-screen configuration, the primary vision area in station 10 may include five screens and four for the secondary vision area. In station 12, the primary vision area would have four screens and five for the secondary vision area. A more experienced and capable agent may handle station 10 while a junior agent can handle station 12. An important consideration is not to overload the primary vision area so that an agent has some slack moments to exercise his or her vision on the secondary vision area.

In the monitoring station configuration and placement illustrated in FIGS. 1 and 2, the secondary vision areas of the first and second monitoring stations have a vertical component 50 and a horizontal component 52. The horizontal upper components 52 are located over portions of the primary vision areas thereof. However, other suitable configurations may be employed.

It is important to note that the first and second monitoring stations need not be disposed adjacent to one another and side by side as shown in FIG. 4, although such illustrated arrangement has a high likelihood of use. The stations and agents may be in separate rooms, in separate buildings and even at locations remote from one another. Where the stations and agents are not together a telephonic or other means allowing communication between the agents should be provided.

FIG. 3 is a schematic diagram illustrating certain other physical components of the apparatus of the subject invention. Monitoring computers 60 receive video signals from surveillance video cameras (not shown) in a conventional manner. The video outputs of monitoring computers 60 are sent through video splitters 62 so that the screens of station 1 and 2 have the same video images. Other monitoring hardware such as digital video recorders can also be used instead of monitoring computers; the system will work essentially the same way. When multiple computers are used for monitoring, it becomes necessary to include a control switch 64, such as the common KVM switch, for each station to enable one input control device 66 such as a keyboard and a mouse, to control all the computers associated with a station. Each monitoring station allows total independent control of each monitoring computer since it has its own input control device and control switch.

In short, the system will create two identical monitoring stations that have the same full control of the monitoring computers. However, the monitor screen placements according to FIGS. 1, 2 and 4 allow redundant monitoring without increasing monitoring personnel by taking advantage of peripheral vision. While the number of screen displays required is about double what is needed for prior art approaches and additional components such as video splitters, and larger size computer control switches are also needed resulting in bigger initial hardware investments, the subject invention can generate numerous on-going benefits as recited above.

The invention claimed is:

1. A video monitoring method comprising the steps of:
providing at least one monitoring computer or other video image receiving hardware for receiving video signals;
providing a first monitoring station having a plurality of monitoring screens;
providing a second monitoring station having a plurality of monitoring screens;
displaying a plurality of surveillance video images from said at least one monitoring computer or other video image receiving hardware on the monitoring screens of said first and second monitoring stations, with surveillance video images on monitoring screens of said first monitoring station being the same as surveillance video images on the monitoring screens of said second monitoring station but the relative positioning of the video images displayed on the monitoring screens of said first monitoring station differing from the relative positioning of the video images displayed on the monitoring screens of said second monitoring station, the monitoring screens of said first and second monitoring stations positioned for observation by two individuals from locations in front of said first and second, monitoring stations, one of the individuals positioned at a location in front of said first monitoring station and the other of the individuals positioned at a location in front of said second monitoring station;
dividing each of said first and second monitoring stations into a primary vision area and a secondary vision area;
keeping, by said monitoring computer or other video image receiving hardware, the primary vision area of said first monitoring station within the range of the central vision of the individual positioned at the location in front of the first monitoring station and assigning primary responsibility for monitoring the images within the primary vision area of the first monitoring station to the individual positioned at the location in front of the first monitoring station;
keeping, by said monitoring computer or other video image receiving hardware, the primary vision area of said second monitoring station within the range of the central vision of the individual positioned at the location in front of the second monitoring station and assigning primary responsibility for monitoring the images within the primary vision area of the second monitoring station to the individual positioned at the location in front of the second monitoring station;
keeping, by said monitoring computer or other video image receiving hardware, the secondary vision area of said first monitoring statin outside the range of the central vision but within the range of the peripheral vision of the individual positioned at the location in front of the first monitoring station; and
keeping, by said monitoring computer or other video image receiving hardware, the secondary vision area of the second monitoring station outside the range of the central vision but within range of the peripheral vision of the individual positioned at the location in front of the second monitoring station;
on the monitoring screens within the primary vision area of the first monitoring station, displaying the same video images that the individual positioned at the location in front of the first monitoring station has primary monitoring responsibility;
on the monitoring screens within the secondary vision area of the first monitoring station, displaying the same video images that the individual positioned at the location in front of the second monitoring station has primary monitoring responsibility;
on the monitoring screens within the primary vision area of the second monitoring station, displaying the same video images that the individual positioned at the location in front of the second monitoring station has primary monitoring responsibility; and
on the monitoring screens within the secondary vision area of the second monitoring station, displaying the same video images that the individual positioned at the location in front of the first monitoring station has primary monitoring responsibility.

2. The video monitoring method according to claim 1 wherein the secondary vision areas of the first and second monitoring stations have a vertical component and a horizontal upper component.

3. The video monitoring method according to claim 2 wherein said horizontal upper components of the secondary vision areas of the first and second monitoring stations are located over portions of the primary vision areas thereof.

4. The video monitoring method according to claim 1 wherein the primary vision area and the secondary vision area of at least one of said first and second monitoring stations encompass the same number of monitoring screens.

5. The video monitoring method according to claim 1 wherein the primary vision area and the secondary vision area of at least one of said first and second monitoring stations encompass different numbers of monitoring screens.

6. The video monitoring method according to claim 1 wherein the first and second monitoring stations are disposed adjacent to one another.

7. The video monitoring method according to claim 1 wherein the first and second monitoring stations are disposed side by side.

* * * * *